(12) United States Patent
Hanna

(10) Patent No.: US 8,104,073 B2
(45) Date of Patent: Jan. 24, 2012

(54) EXCHANGE OF NETWORK ACCESS CONTROL INFORMATION USING TIGHTLY-CONSTRAINED NETWORK ACCESS CONTROL PROTOCOLS

(75) Inventor: Stephen R. Hanna, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1078 days.

(21) Appl. No.: 11/857,111

(22) Filed: Sep. 18, 2007

(65) Prior Publication Data

US 2009/0041252 A1   Feb. 12, 2009

Related U.S. Application Data

(60) Provisional application No. 60/955,111, filed on Aug. 10, 2007.

(51) Int. Cl.
  *H04L 29/04* (2006.01)
  *H04L 9/32* (2006.01)
(52) U.S. Cl. ............... 726/4; 713/168; 713/171
(58) Field of Classification Search ...... 726/4; 713/168, 713/171
See application file for complete search history.

(56) References Cited

U.S. PATENT DOCUMENTS

| 7,574,599 | B1 * | 8/2009 | Zhang | 713/168 |
| 2001/0047484 | A1 * | 11/2001 | Medvinsky et al. | 713/201 |
| 2003/0069967 | A1 * | 4/2003 | Vincent | 709/225 |
| 2005/0187966 | A1 * | 8/2005 | Iino | 707/102 |
| 2007/0143629 | A1 * | 6/2007 | Hardjono et al. | 713/189 |
| 2007/0150934 | A1 * | 6/2007 | Fiszman et al. | 726/1 |
| 2008/0282325 | A1 * | 11/2008 | Oyama et al. | 726/4 |

OTHER PUBLICATIONS

Office Action dated Feb. 23, 2011, for corresponding Chinese Application No. 200810089841.9, 11 pp.
Office Action received in corresponding Chinese Application No. 200810089841.9, mailed Jul. 25, 2011, 5 pgs.

* cited by examiner

*Primary Examiner* — Kambiz Zand
*Assistant Examiner* — Michael Guirguis
(74) *Attorney, Agent, or Firm* — Shumaker & Sieffert, P.A.

(57) ABSTRACT

In general, techniques are described for securely exchanging network access control information. The techniques may be useful in situations where an endpoint device and an access control device perform a tightly-constrained handshake sequence of a network protocol when the endpoint device requests access to a network. The handshake sequence may be constrained in a variety of ways. Due to the constraints of the handshake sequence, the endpoint device and the access control device may be unable to negotiate a set of nonce information during the handshake sequence. For this reason, the access control device uses a previously negotiated set of nonce information and other configuration information associated with the endpoint device as part of a process to determine whether the endpoint device should be allowed to access the protected networks.

25 Claims, 6 Drawing Sheets

EXCHANGE OF NETWORK ACCESS CONTROL INFORMATION USING TIGHTLY-CONSTRAINED NETWORK ACCESS CONTROL PROTOCOLS

This application claims the benefit of U.S. Provisional Application No. 60/955,111, filed Aug. 10, 2007, the entire content of which is incorporated herein by reference.

TECHNICAL FIELD

The invention relates to computer networks and particularly to network access control.

BACKGROUND

Enterprises and other organizations implement network access control in order to control the ability of endpoint devices to communicate on a computer network. For example, an enterprise may implement a computer network that includes an email server. In order to prevent unauthorized users from communicating with this email server, the enterprise may implement a network access control system that prevents unauthorized users from sending network communications on the computer network unless the users provide a correct username and password. In another example, an enterprise may assess the "health" of the endpoint device prior to allowing the endpoint device to access the enterprise computer network. For example, the enterprise may wish to prevent devices that are infected with computer viruses from communicating with devices on a network of the enterprise. In this example, the enterprise may implement a network access control system that prevents devices that do not have current anti-virus software from communicating on the network.

An endpoint device may gain access to a protected network by using a network protocol to provide proper network access control information to a network access control server. The network access control information may specify data that indicates a configuration of the endpoint device, an identity of the user of the endpoint device, information needed to verify the data that indicates the configuration of the endpoint device, and other information. The data that indicates the configuration of the endpoint device may indicate software applications installed on the endpoint device, hardware installed on the endpoint device, and other configuration information specific to the endpoint device. The network access control server evaluates the network access control information provided by the endpoint device in order to determine whether to allow the endpoint device to communicate on the protected network.

SUMMARY

In general, techniques are described for securely exchanging network access control information. The techniques may be useful in situations where an endpoint device and an access control device perform a tightly-constrained handshake sequence of a network protocol when the endpoint device requests access to a network. The handshake sequence may be constrained in a variety of ways. For example, the endpoint device and the access control device may only be able to exchange a limited number of bytes during the handshake. As another example, the endpoint device and the access control device may only be able to exchange a limited number of messages. Due to the constraints of the handshake sequence, the endpoint device and the access control device may be unable to negotiate a set of nonce information during the handshake sequence. For this reason, the access control device uses a previously negotiated set of nonce information and other configuration information associated with the endpoint device as part of a process to determine whether the endpoint device should be allowed to access the protected networks.

In one aspect, a method comprises receiving, with an access control device, a digital signature through a tightly-constrained handshake sequence of a network protocol. An endpoint device initiates the tightly-constrained handshake sequence when the endpoint device is requesting access rights. The digital signature is based on a trusted platform module ("TPM") value and a nonce value. Due to constraints of the tightly-constrained handshake sequence, the access control device and the endpoint device are unable to negotiate a set of nonce information during the tightly-constrained handshake sequence. The method also comprises determining whether the access control device has previously negotiated the set of nonce information with the endpoint device. Furthermore, the method comprises determining whether the TPM value is associated with an acceptable configuration. The method also comprises determining whether the nonce value is acceptable. In addition, the method comprises determining whether the digital signature is valid. The method also comprises granting the access rights to the endpoint device when the access control device has previously negotiated the set of nonce information, when the TPM value is associated with the acceptable configuration, when the nonce value is acceptable, and when the digital signature is valid.

In another aspect, an access control device comprises a request reception module that receives a digital signature through a tightly-constrained handshake sequence of a network protocol. An endpoint device initiates the tightly-constrained handshake sequence when the endpoint device is requesting access rights. The digital signature is based on a TPM value and a nonce value. Due to constraints of the tightly-constrained handshake sequence, the access control device and the endpoint device are unable to negotiate a set of nonce information during the tightly-constrained handshake sequence. The access control device also comprises a cache management module that determines whether the access control device has previously negotiated the set of nonce information with the endpoint device. In addition, the access control device comprises a TPM evaluation module that determines whether the TPM value is associated with an acceptable configuration. Furthermore, the access control device comprises a nonce evaluation module that determines whether the nonce value is acceptable. In addition, the access control device comprises a signature verification module that determines whether the digital signature is valid. The access control device also comprises an access instruction module that grants the access rights to the endpoint device when the access control device has previously negotiated the set of nonce information, when the TPM value is associated with the acceptable configuration, when the nonce value is acceptable, and when the digital signature is valid.

In another aspect, a computer-readable medium comprises instructions. When executed by one or more programmable processors of an access control device, the instructions cause the one or more programmable processors to receive a digital signature through a tightly-constrained handshake sequence of a network protocol. An endpoint device initiates the tightly-constrained handshake sequence when the endpoint device is requesting access rights. The digital signature is based on a TPM value and a nonce value. Due to constraints of the tightly-constrained handshake sequence, the access control device and the endpoint device are unable to negotiate a set of nonce information during the tightly-constrained handshake sequence. In addition, the instructions cause the one or more programmable processors to determine whether the access control device has previously negotiated the set of nonce information with the endpoint device. The instructions also cause the one or more programmable processors to determine whether the TPM value is associated with an acceptable configuration. Moreover, the instructions cause the one or more programmable processors to determine whether the nonce value is acceptable. In addition, the instructions cause the one or more programmable processors to use the digital signature to determine whether the digital signature is valid. The instructions cause the one or more programmable processors to grant the access rights to the endpoint device when the access control device has previously negotiated the set of nonce information with the endpoint device, when the TPM value is associated with the acceptable configuration, when the nonce value is acceptable, and when the digital signature is valid.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
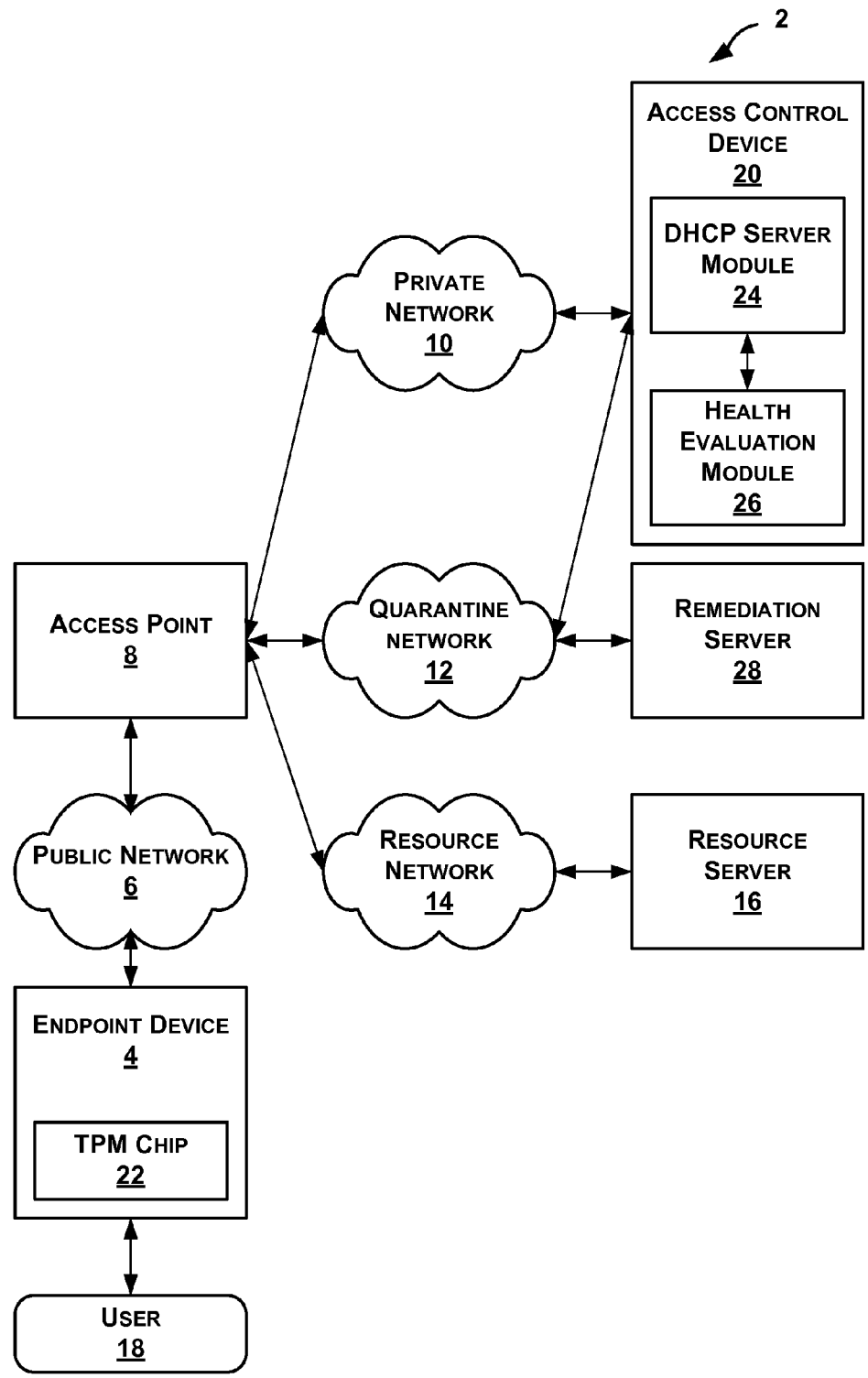
FIG. 1 is a block diagram illustrating an exemplary system that employs network access control.

FIG. 1 is a block diagram illustrating an exemplary system 2 that employs network access control. As illustrated in the example of FIG. 1, system 2 includes an endpoint device 4. Endpoint device 4 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of network device.

Endpoint device 4 is connected to a public network 6. Public network 6 may be a wide area network (e.g., the Internet), a local area network ("LAN"), a virtual local area network ("VLAN"), or another type of network. Public network 6 may comprise one or more wired or wireless links. For example, public network 6 may be an Ethernet network that comprises one or more Ethernet cables. In another example, public network 6 may be a Wireless Fidelity ("Wi-Fi") network that uses wireless radio transmissions to communicate information. From a security standpoint, it is assumed that any member of the public is capable of accessing public network 6 at any time.

In the example of FIG. 1, an access point 8 is connected to public network 6 and provides connectivity to an enterprise network, which is shown as divided into a private network 10, a quarantine network 12, and a resource network 14. Access point 8 is a network device that is capable of selectively forwarding network communications from public network 6 to one or more of private network 10, quarantine network 12, or resource network 14. For instance, access point 8 may be a wireless access point, a network switch, a network router, a firewall, a network bridge, or another type of network device. Access point 8 may also selectively forward network communications from private network 10, quarantine network 12, and resource network 14 to public network 6. Private network 10, quarantine network 12, and resource network 14 may be separate physical networks, virtual local area networks that operate over the same physical network, or some other type of networks or combination of networks.

In general, the enterprise network provides a variety of resources for which endpoint device 4 desires access. For exemplary purposes, the enterprise network is shown as including a resource server 16 connected to resource network 14, although typically a number of different interconnected servers, printers, or other devices may be used. For example, resource server 16 may be a network device that provides an email access service. Other example network resources may include, but are not limited to, network file system resources, streaming media resources, Internet access services, database access resources, application server resources, video game server resources, and other types of network resources.

A user 18 of endpoint device 4 may wish to use endpoint device 4 to interact with the network resources provided by resource server 16. Alternatively, a hardware or software module in endpoint device 4 may require interaction with the network resources provided by resource server 16 without the intervention of user 18. In order for endpoint device 4 to interact with the network resources provided by resource server 16, an access control device 20 must grant access rights to endpoint device 4. For instance, access control device 20 may instruct resource server 16 to allow endpoint device 4 to use a resource. In another instance, access control device 20 must grant endpoint device 4 access rights to communicate on resource network 14. In the example of system 2, access control device 20 is connected to private network 10. Access control device 20 may be a wide variety of different types of devices. For example, access control device 20 may be a policy server, a Dynamic Host Configuration Protocol ("DHCP") server, a firewall device, an intermediate network device, an intrusion detection device, an Internet Protocol Security gateway device, or any other type of device that controls endpoint devices' access to one or more networks. Furthermore, in some implementations, the functionality of access control device 20 may be divided among several devices.

Endpoint device 4 and access control device 20 may perform a tightly-constrained handshake sequence of a network protocol when endpoint device 4 requires access rights. A handshake sequence is a series of messages in which parameters for further communication are established. Access control device 20 requires endpoint device 4 to provide a set of Network Access Control ("NAC") information to access control device 20 during the handshake sequence. Access control device 20 may use the NAC information to determine whether to allow endpoint device 4 to communicate on resource network 14.

The NAC information may include a digital signature based on a Trusted Platform Module ("TPM") register value and a nonce value. As used in this disclosure, a "digital signature based on a TPM value and a nonce value" is value that access control device 20 may use to verify the identity of the generator of the digital signature and to verify that the generator of the digital signature was in possession of the TPM value and the nonce value at the time when the digital signature was generated. The digital signature may be generated in a variety of ways.

In a first example of how the digital signature may be generated, the digital signature may be the result of (1) concatenating the TPM value and the nonce value, (2) generating a hash value by applying a hash function to this concatenation, and (3) then using a private encryption key of a TPM chip 22 in endpoint device 4 to encrypt the hash value. In this first example, access control device 20 may use the digital signature to verify that TPM chip 22 generated the digital signature and that TPM chip 22 was in possession of the TPM value and the nonce value when TPM chip 22 generated the digital signature by: (1) using a public encryption key associated with the private encryption key of TPM chip 22 to generate a decrypted value; (2) applying the hash function to the TPM value and the nonce value, thereby generating a hash value; and (3) determining that TPM chip 22 generated the digital signature and that TPM chip 22 was in possession of the TPM value and the nonce value at the time that TPM chip 22 generated the digital signature when the decrypted value is equal to the hash value. In this first example, the identity of TPM chip 22 is verified because a successful match only occurs when the digital signature was generated using the private encryption key of TPM chip 22, which is only in the possession of TPM chip 22. Furthermore in this first example, the fact that TPM chip 22 was in possession of the TPM value and the nonce value when TPM chip 22 generated the digital signature is verified because, due to the nature of the hash function, TPM chip 22 must have been in possession of the TPM value and the nonce value in order to generate the digital signature.

In a second example of how the digital signature may be generated, the digital signature may be generated by: (1) generating an input value by concatenating the TPM value, the nonce value, and symmetric key; and (2) applying a cryptographic hash function to the input value, thereby generating the final digital signature. In this second example, only TPM chip 22 and access control device 20 possess the symmetric key. When access control device 20 receives the digital signature, access control device 20 may (1) generate a preliminary value by concatenating the TPM value, the nonce value, and the symmetric key; (2) applying the cryptographic hash function to the preliminary value, thereby creating a hash value; and (3) determining that TPM chip 22 generated the digital signature and was in possession of the TPM value and the nonce value at the time that TPM chip 22 generated the digital signature when the hash value is equal to the digital signature. In this second example, the identity of TPM chip 22 is verified because only TPM chip 22 and access control device 20 possess the symmetric key. In addition, the fact that TPM chip 22 was in possession of the TPM value and the nonce value when TPM chip 22 generated the digital signature is verified because the hash value could not, due to the cryptographic hash function, be equal to the digital signature unless TPM chip 22 was in possession of the decrypted value, the nonce value, and the symmetric key. While the remainder of this disclosure refers to the first example of how digital signatures may be generated, it should be appreciated that the following descriptions and examples may be modified to use the digital signatures described in this second example of how digital signatures are generated.

The TPM value upon which the digital signature is based is a value generated by TPM chip 22 that succinctly indicates a configuration of endpoint device 4. TPM chip 22 is a hardware module built into endpoint device 4 that generates and stores values that cannot be altered by hardware modules or software applications outside TPM chip 22. As explained in detail below, TPM chip 22 may generate the TPM value by successively applying a hash function to the machine code instructions of various software applications before endpoint device 4 loads those software applications. Thus, the TPM value is a hash value associated with a specific configuration of important software on endpoint device 4.

The nonce value upon which the digital signature is based is a value that is used only once. Because nonce values are used only once, endpoint device 4 and access control device 20 may use nonce values to thwart replay attacks. In the absence of the nonce value, a malicious user or program could intercept and store the TPM value or a digital signature based solely on the TPM value. After intercepting and storing the TPM value and the associated digital signature, the malicious user or program could alter the configuration of endpoint device 4. The malicious user or program could then subsequently resend the stored TPM value and associated digital signature in order to gain access to resource network 14. Because the TPM value indicates an acceptable configuration and because the digital signature indicates that the TPM value has not been altered, access control device 20 could grant endpoint device 4 access to resource network 14, despite the fact that endpoint device 4 does not have an acceptable configuration. In this way, a malicious user or program could provide health evaluation module 26 with a TPM value that is signed by TPM chip 22 but that does not reflect the actual configuration of endpoint device 4.

The nonce value in the set of NAC information may defeat such replay attacks by being different each time endpoint device 4 performs the handshake sequence with access control device 20. For example, an attacker may intercept a digital signature based on the TPM value and a nonce value. In this example, the attacker, posing as endpoint device 4, may attempt to use this digital signature in a handshake sequence with access control device 20. However, when access control device 20 receives the digital signature from the attacker, access control device 20 will determine that access control device 20 has previously received a digital signature based on the TPM value and the nonce value. Consequently, access control device 20 will deny the attacker access to resource network 14.

In a typical arrangement, access control device 20 would provide a nonce value to endpoint device 4 before endpoint device 4 generates a digital signature based on the nonce value. Under this typical arrangement, endpoint device 4 would receive the nonce value and send the received nonce value back to access control device 20. In this way, access control device 20 would be able to anticipate which nonce value endpoint device 4 would use. However, due to the constraints of the handshake sequence used in system 2, access control device 20 is unable to send a nonce value to endpoint device 4 before endpoint device 4 must send the digital signature based on a nonce value to access control device 20. In more general terms, due to the constraints of the handshake sequence used in system 2, access control device 20 and endpoint device 4 are unable to negotiate a set of nonce information during the handshake sequence. This set of nonce information is a set of information that endpoint device 4 and access control device 20 may use to identify a nonce value for use during a handshake sequence.

To illustrate this situation, consider the example of the Dynamic Host Configuration Protocol ("DHCP"). As illustrated in the example of FIG. 1, access control device 20 may include a DHCP server module 24. DHCP server module 24 uses DHCP to selectively lease IP addresses to endpoint devices. DHCP server module 24 may control access to quarantine network 12 and resource network 14 by selecting IP addresses from different subnets for lease to endpoint devices based on the identity of the users of the endpoint devices, the configurations of the endpoint devices, and possibly on other bases. For instance, access point 8 may be configured to forward network packets that specify source IP addresses in a first subnet to quarantine network 12, but not to forward network packets that specify source IP addresses in the first subnet to resource network 14. Thus, if DHCP server module 24 leases an IP address in the first subnet to endpoint device 4, endpoint device 4 is able to communicate on quarantine network 12 but is not able to communicate on resource network 14. Likewise, access point 8 may be configured to forward network packets that specify source IP addresses in a second subnet to resource network 14, but not to forward network packets that specify source IP addresses in the second subnet to quarantine network 12. In this case, if DHCP server module 24 leases an IP address in the second subnet to endpoint device 4, endpoint device 4 is able to communicate on resource network 14, but not on quarantine network 12.

In order to obtain an IP address, endpoint device 4 may initiate a handshake sequence of the DHCP protocol. As applied in system 2, the handshake sequence of the DHCP protocol consists of a "DHCP discovery" message from endpoint device 4 to a DHCP server module 24 in access control device 20, a "DHCP offer" message from DHCP server module 24 to endpoint device 4, a "DHCP request" message from endpoint device 4 to DHCP server module 24, and a "DHCP acknowledge" message from DHCP server module 24 to endpoint device 4. The DHCP protocol permits endpoint device 4 to include "option" fields in the DHCP discovery and DHCP request messages. As applied in system 2, endpoint device 4 may use the "option" fields in the DHCP discovery message to communicate a digital signature. However, the DHCP protocol requires access control device 20 to determine whether to allow endpoint device 4 to communicate on resource network 14 before access control device 20 sends the DHCP offer message. Therefore, if endpoint device 4 is to communicate a digital signature to access control device 20 during the handshake sequence of the DHCP protocol and access control device 20 is to use this digital signature to determine whether to allow endpoint device 4 to communicate on resource network 14, endpoint device 4 may be required to send the digital signature in the DHCP discovery message. However, in accordance with the DHCP handshake sequence, the DHCP discovery message precedes any communication from the DHCP server. For this reason, the DHCP handshake sequence does not provide any opportunity for the DHCP server to send a nonce value to endpoint device 4. Because the DHCP handshake sequence does not provide any opportunity to send a nonce value to endpoint device 4, endpoint device 4 cannot use a nonce value sent during the DHCP handshake sequence to generate the digital signature.

In accordance with the techniques of this disclosure, endpoint device 4 may automatically output an initial message of the handshake sequence when endpoint device 4 seeks access to resource network 14. For instance, endpoint device 4 may automatically output a DHCP discovery message. This initial message may specify a set of network access control ("NAC") information. The set of NAC information includes a digital signature based on a trusted platform module ("TPM") register value and a nonce value. The set of NAC information may also include the TPM value, the nonce value, and possibly other information.

When access point 8 receives the initial message from endpoint device 4 on public network 6, access point 8 may forward the initial message to access control device 20 via private network 10. When access control device 20 receives the initial message, a health evaluation module 26 uses the NAC information in the initial message to evaluate the health status of endpoint device 4. As used in this disclosure, the term "health status of a device" refers to the configuration of security-sensitive hardware and software of the device.

In order to evaluate the health status of endpoint device 4, health evaluation module 26 may determine whether endpoint device 4 and access control device 20 have previously negotiated a set of nonce information. In other words, health evaluation module 26 may determine whether endpoint device 4 and access control device 20 have exchanged information that indicates to access control device 20 the nonce value upon which the digital signature of the NAC information is based.

If health evaluation module 26 has not previously negotiated a set of nonce information with endpoint device 4, health evaluation module 26 may allow endpoint device 4 to communicate on quarantine network 12. For example, if health evaluation module 26 has not previously negotiated a set of nonce information with endpoint device 4, health evaluation module 26 may instruct DHCP server module 24 to lease to endpoint device 4 an IP address associated with quarantine network 12. In this example, when health evaluation module 26 instructs DHCP server module 24 to lease to endpoint device 4 an IP address associated with quarantine network 12, DHCP server module 24 outputs to private network 10 a DHCP offer message that specifies an IP address associated with quarantine network 12. When access point 8 receives this DHCP offer message, access point 8 forwards the DHCP offer message to public network 6 for delivery to endpoint device 4. After allowing endpoint device 4 to communicate on quarantine network 12, health evaluation module 26 may use quarantine network 12 to negotiate a set of nonce information with endpoint device 4. For instance, health evaluation module 26 may then use the IP address assigned by DHCP server 24 to send a request to endpoint device 4 for the nonce information. Endpoint device 4 may send this requested information on public network 6. When access point 8 receives the requested set of nonce information, access point 8 forwards the requested set of nonce information on quarantine network 12. Health evaluation module 26 may then receive the requested set of nonce information from quarantine network 12.

If health evaluation module 26 has previously negotiated a set of nonce information with endpoint device 4, health evaluation module 26 may determine whether access control device 20 has received a public key certificate of TPM chip 22. If access control device 20 has not previously received a public key certificate of TPM chip 22, health evaluation module 26 may allow endpoint device 4 to communicate on quarantine network 12. For instance, health evaluation module 26 may instruct DHCP server module 24 to lease to endpoint device 4 an IP address associated with quarantine network 12. Health evaluation module 26 may then, in a manner similar to negotiation of the set of nonce information with endpoint device 4, use quarantine network 12 to request the public key certificate of TPM chip 22 from endpoint device 4.

After health evaluation module 26 has determined that access control device 20 has negotiated a set of nonce information with endpoint device 4 and has received a public key certificate associated with TPM chip 22, health evaluation module 26 may determine whether the nonce value in the NAC information is acceptable. Depending on the set of nonce information negotiated between endpoint device 4 and access control device 20, health evaluation module 26 may determine whether the nonce value in the NAC information is acceptable in a variety of ways. For instance, if the set of nonce information comprises a set of values, health evaluation module 26 may determine that the nonce value in the NAC information is acceptable when the nonce value in the NAC information is equal to a value in the set of values. In this instance, health evaluation module 26 may remove this value from the set of values so that the nonce value cannot be used again.

After determining that the nonce value is acceptable, health evaluation module 26 may determine whether the digital signature in the set of NAC information is valid. In one exemplary implementation, endpoint device 4 may create the digital signature by applying a hash function to the TPM value and the nonce value and then encrypting the resulting hash value using a private encryption key of TPM chip 22. The private encryption key of TPM chip 22 is known only within TPM chip 22 and is not readable or writeable by any other hardware module or software application in endpoint device 4, including the operating system of endpoint device 4. In this example, when health evaluation module 26 receives the NAC information, health evaluation module 26 may generate a new hash value by applying the same hash function to the TPM value and the nonce value specified by the NAC information and may use the public encryption key of TPM chip 22 to decrypt the digital signature. If the decrypted digital signature is equal to the new hash value, the digital signature is valid. Because the digital signature is valid, health evaluation module 26 may be relatively confident that the TPM value and the nonce value have not been altered after TPM chip 22 created the digital signature. Furthermore, because the private encryption key of TPM chip 22 is not readable or writeable by anything other than TPM chip 22, health evaluation module 26 may be relatively confident that TPM chip 22 actually created the digital signature. Hence, health evaluation module 26 may be relatively confident that the TPM value correctly indicates the actual health status of endpoint device 4.

After determining that the TPM value in the set of NAC information actually reflects the current configuration of endpoint device 4, health evaluation module 26 determines whether the TPM value indicates that endpoint device 4 has an acceptable configuration. For instance, health evaluation module 26 may use the TPM value to determine whether a specific set of software applications are executing on endpoint device 4.

If health evaluation module 26 determines that endpoint device 4 does not have an acceptable configuration, that the nonce value is not acceptable, or that the digital signature is not valid, health evaluation module 26 may allow endpoint device 4 to communicate on quarantine network 12. For example, health evaluation module 26 may instruct DHCP server module 24 to lease to endpoint device 4 an IP address associated with quarantine network 12. In this example, when health evaluation module 26 instructs DHCP server module 24 to lease to endpoint device 4 an IP address associated with quarantine network 12, DHCP server module 24 outputs to private network 10 a DHCP offer message that specifies an IP address associated with quarantine network 12. When access point 8 receives this DHCP offer message, access point 8 may forward the DHCP offer message to public network 6 for delivery to endpoint device 4. Subsequently, when endpoint device 4 receives the DHCP offer message, endpoint device 4 may start using the IP address specified by the DHCP offer message. Because the IP address specified by the DHCP offer message is associated with quarantine network 12, access point 8 only forwards packets from endpoint device 4 that are addressed to devices in quarantine network 12. If DHCP server module 24 leases an IP address associated with quarantine network 12 to endpoint device 4 because endpoint device 4 does not have an acceptable configuration, endpoint device 4 may access a remediation server 28 via quarantine network 12. Remediation server 28 may provide resources that enable endpoint device 4 to achieve an acceptable configuration. For example, endpoint device 4 may be able to download antivirus software from remediation server 28.

Otherwise, if health evaluation module 26 determines that endpoint device 4 has an acceptable configuration, that the nonce value is acceptable, and that the digital signature is valid, health evaluation module 26 may grant the request access rights to endpoint device 4. For example, health evaluation module 26 may instruct DHCP server module 24 to lease to endpoint device 4 an IP address associated with resource network 14, thereby granting endpoint device 4 the right to access (i.e., communicate on) resource network 14. When health evaluation module 26 instructs DHCP server module 24 to lease to endpoint device 4 an IP address associated with resource network 14, DHCP server module 24 completes the handshake sequence by outputting to private network 10 a DHCP offer message that specifies an IP address associated with resource network 14. When access point 8 receives this DHCP offer message, access point 8 may forward the DHCP offer message to public network 6 for delivery to endpoint device 4. Subsequently, when endpoint device 4 receives the DHCP offer message, endpoint device 4 may start using the IP address specified by the DHCP offer message. Because the IP address specified by the DHCP offer message is associated with resource network 14, access point 8 only forwards packets from endpoint device 4 that are addressed to devices in resource network 14.

The techniques described in this disclosure may provide one or more advantages. For example, the techniques may be useful in systems that utilize a tightly-constrained handshake sequence of a network protocol in conjunction with TPM-based integrity checks, such as the example of FIG. 1 in which TPM values are used even though DHCP specifies a handshake sequence that allows a maximum of two communications in an initial lease process, i.e., a DHCP discovery message and a DHCP offer message. For example, the techniques may enable an endpoint device to send a digitally signed TPM value and a nonce value to an access control device without first receiving the nonce value from the access control device. In this example, the access control device may accept the nonce value based on nonce information previously negotiated with the endpoint device. This may be important in network protocols in which, due to the constraints of the handshake sequences of the network protocols, an endpoint device and an access control device are unable to negotiate a nonce value during the handshake sequence. Example protocols that may define tight constraints so as to preclude such an opportunity include, but are not limited to, current versions of DHCP, the Statement of Health ("SoH") protocol, Internet Protocol Security ("IPSec"), and Extensible Authentication Protocol ("EAP"). Due to the constraints imposed by the current versions of these protocols on the maximum number of messages and/or the maximum amounts of data that may be communicated during handshake sequences of these protocols, an access control device may be unable to use the handshake sequences of these protocols to send a nonce value or other NAC information to an endpoint device. Furthermore, due to the tight constraints of the handshake sequences of these protocols, the endpoint device may not be able to send a TPM value, a nonce value, a digital signature value, and a digital certificate to the access control device during the handshake sequences of these protocols. In a second example, the techniques may enable an endpoint device to send a digitally signed TPM value and nonce value to an access control device without simultaneously sending a public key certificate in the same message. This may be important in network communications protocols as DHCP in which message sizes are restricted. For example, DHCP discovery messages generally have a maximum of 312 to 1400 bytes of options data. This amount of options data may be insufficient to store a TPM value, a nonce value, a digital signature, and a digital certificate. Furthermore, it should be appreciated that the techniques described in this disclosure may be applicable to network protocols other than DHCP that require a tightly-constrained handshake.

Figure 2:
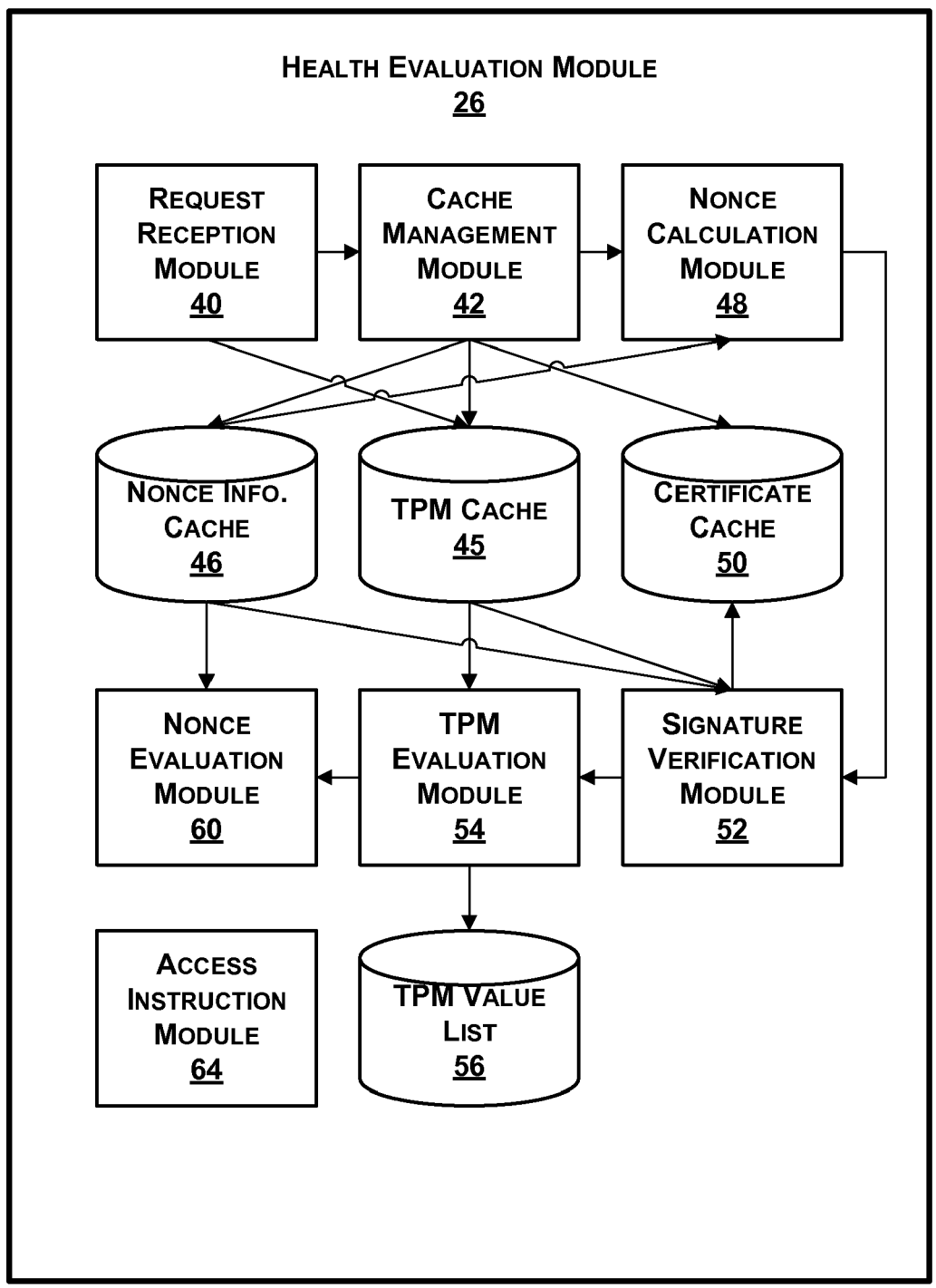
FIG. 2 is a block diagram illustrating exemplary details of a health evaluation module in an access control device.

FIG. 2 is a block diagram illustrating exemplary details of health evaluation module 26. As illustrated in the example of FIG. 2, health evaluation module 26 includes a request reception module 40. Request reception module 40 receives NAC information from DHCP server module 24 through a tightly-constrained handshake sequence. Due to constraints of this tightly-constrained handshake sequence, health evaluation module 26 and endpoint device 4 are unable to negotiate a set of nonce information during the tightly-constrained handshake sequence. The NAC information includes, at a minimum, a digital signature based on a TPM value and a nonce value. When request reception module 40 receives NAC information from DHCP server module 24, request reception module 40 provides the NAC information to a cache management module 42 in health evaluation module 26.

Cache management module 42 manages information in a TPM cache 45, a nonce information cache 46 and a certificate cache 50. Nonce information cache 46, TPM cache 45, and certificate cache 50 may be one or more securely-accessible computer-readable media internal or external to access control device 20. Nonce information cache 46 stores sets of nonce information. Each set of nonce information in nonce information cache 46 is associated with a different endpoint device. Each set of nonce information specifies one or more nonce values or information from which nonce values can be derived. Certificate cache 50 stores public key certificates. Each public key certificate in certificate cache 50 may be associated with a different TPM chip in a different endpoint device. TPM cache 45 stores TPM values. Each TPM value in TPM cache 45 may be associated with a different endpoint device.

When cache management module 42 receives the NAC information of endpoint device 4, cache management module 42 may determine whether the NAC information includes a TPM value. If the NAC information includes a TPM value, cache management module 42 may store the TPM value in TPM cache 45. Otherwise, if the NAC information does not include a TPM value, cache management module 42 may determine whether TPM cache 45 stores a TPM value associated with endpoint device 4. TPM cache 45 may store a TPM value associated with endpoint device 4 that access control device 20 received during a prior handshake sequence with endpoint device 4 or during a communication outside a handshake sequence. In addition, cache management module 42 may determine whether nonce information cache 46 stores a set of nonce information associated with endpoint device 4. Cache management module 42 also determines whether certificate cache 50 stores a public key certificate associated with TPM 22 in endpoint device 4. If the NAC information does not include a TPM value and TPM cache 45 does not include a TPM value associated with endpoint device 4, if nonce information cache 46 does not store a set of nonce information associated with endpoint device 4, or if certificate cache 50 does not store a public key certificate associated with TPM chip 22 in endpoint device 4, an access instruction module 64 may instruct DHCP server module 24 to lease to endpoint device 4 an IP address associated with quarantine network 12. When access point 8 receives IP packets that specify source IP addresses associated with quarantine network 12, access point 8 only forwards the IP packets when the IP packets specify destination IP addresses assigned to devices in quarantine network 12.

After DHCP server module 24 has leased to endpoint device 4 an IP address associated with quarantine network 12, cache management module 42 may use this IP address to negotiate a set of nonce information with endpoint device 4. In negotiating the set of nonce information, cache management module 42 or endpoint device 4 may dictate a set of nonce information for endpoint device 4 to use, endpoint device 4 may instruct cache management module 42 which set of nonce information endpoint device 4 will use, or endpoint device 4 and cache management module 42 may cooperatively agree on the set of nonce information. In addition, cache management module 42 may use this IP address to request any remaining NAC information that health evaluation module 26 needs in order to determine whether to allow endpoint device 14 to communicate on resource network 14. For instance, cache management module 42 may use this IP address to request from endpoint device 4 a TPM value upon which the digital signature in the received NAC information is based. When cache management module 42 receives the TPM value associated with TPM chip 22, cache management module 42 may store the TPM value in TPM cache 45. When cache management module 42 negotiates the set of nonce information associated with endpoint device 4, cache management module 42 may store the set of nonce information in nonce information cache 46. When cache management module 42 receives the public key certificate associated with TPM chip 22, cache management module 42 may store the public key certificate in certificate cache 50.

If cache management module 42 determines that health evaluation module 26 has received all NAC information needed to determine whether to allow endpoint device 4 to communicate on resource network 14, a nonce calculation module 48 in health evaluation module 26 determines whether the received NAC information includes a nonce value. If the received NAC information does not include a nonce value, nonce calculation module 48 may calculate a set of one or more candidate nonce values based on the set of nonce information associated with endpoint device 4 stored in nonce information cache 46. For example, the set of nonce information associated with endpoint device 4 may be a sequence number. In this example, nonce calculation module 48 may calculate a set of candidate nonce values equal to numbers that follow the sequence number in the set of nonce information associated with endpoint device 4. In this example, nonce calculation module 48 may calculate more than one candidate nonce value because endpoint device 4 may have unsuccessfully attempted to send a nonce value. Hence, from the perspective of health evaluation module 26, endpoint device 4 would appear to have skipped a nonce value in the sequence. After calculating the set of candidate nonce values, nonce calculation module 48 may provide the set of calculated nonce values to a signature verification module 52 in health evaluation module 26.

Signature verification module 52 determines whether the digital signature received during the tightly-constrained handshake sequence is valid. Signature verification module 52 may determine whether the digital signature received during the tightly-constrained handshake sequence is valid in a variety of ways. For example, signature verification module 52 may look up the public key certificate associated with TPM chip 22 in certificate cache 50. Signature verification module 52 may then determine whether the public key certificate is associated with a certificate hierarchy that includes a certificate authority that is trusted by health evaluation module 26. If signature verification module 52 determines that the public key certificate is associated with a certificate hierarchy that includes a certificate authority that is trusted by health evaluation module 26, signature verification module 52 may decrypt the received digital signature using the public key specified by the public key certificate associated with TPM 22. Next, if health evaluation module 26 received a nonce value during the tightly-constrained handshake sequence, signature verification module 52 may calculate a hash value by applying a hash function to the received nonce value and the TPM value associated with endpoint device 4 stored in TPM cache 45. If the hash value is equal to the decrypted digital signature, the digital signature is valid. Alternatively, if health evaluation module 26 did not receive a nonce value during the tightly-constrained handshake sequence, signature verification module 52 may calculate a set of hash values by applying a hash function to the TPM value and each candidate nonce value in the set of candidate nonce values calculated by nonce calculation module 48. After calculating the hash values, signature verification module 52 may determine whether the decrypted digital signature is equal to any of the calculated hash values. If none of the calculated hash values are equal to the decrypted digital signature, the digital signature is not valid. If a given one of the calculated hash values is equal to the decrypted digital signature, the digital signature is valid. This disclosure refers to the nonce value upon which the given one of the hash values is based as the "signed nonce value" and the TPM value upon which the given one of the hash values is based as the "signed TPM value."

If the digital signature is not valid or if the public key certificate associated with TPM chip 22 is not associated with a certificate hierarchy that includes a certificate authority trusted by health evaluation module 26, signature verification module 52 may alert endpoint device 4 that the digital signature is not valid or that the public key certificate associated with TPM chip 22 is not associated with a certificate hierarchy that includes a certificate authority trusted by health evaluation module 26. Furthermore, access instruction module 64 may instruct DHCP server module 24 to lease to endpoint device 4 an IP address associated with quarantine network 12.

On the other hand, if signature verification module 52 determines that the digital signature is valid and that the public key certificate associated with TPM chip 22 is associated with a certificate hierarchy that includes a certificate authority trusted by health evaluation module 26, a TPM evaluation module 54 in health evaluation module 26 determines whether the signed TPM value is associated with an acceptable configuration. For example, TPM evaluation module 54 may determine that the signed TPM value is associated with an acceptable configuration when the signed TPM value matches or otherwise corresponds to a TPM value in a list 56. List 56 specifies TPM values associated with acceptable endpoint device configurations. If TPM evaluation module 54 determines that the signed TPM value does not match or does not otherwise correspond to a TPM value in list 56, access instruction module 64 may instruct DHCP server module 24 to lease to endpoint device 4 an IP address associated with quarantine network 12.

If TPM evaluation module 54 determines that the signed TPM value matches or otherwise corresponds to a TPM value in list 56, a nonce evaluation module 60 in health evaluation module 26 determines whether the signed nonce value is acceptable. For example, in order to determine whether the signed nonce value is acceptable, nonce evaluation module 60 may retrieve from nonce information cache 46 a previously-negotiated set of nonce information associated with endpoint device 4. After retrieving the previously-negotiated set of nonce information, nonce evaluation module 60 may use the previously-negotiated set of nonce information to determine whether health evaluation module 26 has previously received the signed nonce value from endpoint device 4 and whether the signed nonce value complies with the previously-negotiated set of nonce information. Nonce evaluation module 60 may use many different techniques to determine whether health evaluation module 26 has previously received the signed nonce value from endpoint device 4 and whether the signed nonce value complies with the previously-negotiated set of nonce information. The following three paragraphs describe exemplary techniques by which nonce evaluation module 60 determines whether health evaluation module 26 has previously received the signed nonce value and whether the signed nonce value complies with the previously-negotiated set of nonce information. It should be noted that many other techniques in addition to those described below are possible.

In a first example, the set of nonce information may specify a sequence number. In this first example, nonce evaluation module 60 may determine that health evaluation module 26 has not previously received the signed nonce value from endpoint device 4 and that the signed nonce value complies with the previously-negotiated set of nonce information when the signed nonce value follows (e.g., is greater than by a small number) the sequence number specified by the set of nonce information. In this example, if the signed nonce value follows the sequence number specified by the set of nonce information, nonce evaluation module 60 may set the sequence number in the set of nonce information equal to the signed nonce value.

In a second example, the signed nonce value may indicate a time. In this second example, nonce evaluation module 60 may determine whether the time indicated by the signed nonce value is recent and after the time indicated in the set of nonce information. If the signed nonce value is recent and after the time indicated in the set of nonce information, nonce evaluation module 60 may determine that health evaluation module 26 has not previously received the signed nonce value and that the signed nonce value complies with the previously-negotiated set of nonce information. Furthermore, in this second example, nonce evaluation module 60 may update the time indicated by the set of nonce information to be equal to time indicated by the signed nonce value.

In a third example, the set of nonce information specifies a set of nonce values. Endpoint device 4 and/or health evaluation module 26 may have negotiated this set of nonce values in a variety of ways. For instance, endpoint device 4 may generate the complete set of nonce values and send the set of nonce values to health evaluation module 26 (or vice versa). In another instance, endpoint device 4 and health evaluation module 26 may negotiate a seed. In this instance, endpoint device 4 and health evaluation module 26 may then independently generate the set of nonce values as needed using a pseudorandom number generator and the previously-negotiated seed. Nonce evaluation module 60 may determine that the signed nonce value is acceptable when the signed nonce value is equal to or otherwise corresponds to a nonce value in the set of nonce values. If the signed nonce value is equal to or otherwise corresponds to a particular nonce value in the set of nonce values, nonce evaluation module 60 may remove the particular nonce value from the set of nonce values.

If nonce evaluation module 60 determines that the signed nonce value is acceptable, access instruction module 64 may instruct DHCP server module 24 to lease to endpoint device 4 an IP address associated with resource network 14. On the other hand, if nonce evaluation module 60 determines that the signed nonce value is not acceptable, access instruction module 64 may instruct DHCP server module 24 to lease to endpoint device 4 an IP address associated with quarantine network 12.

Figure 3:
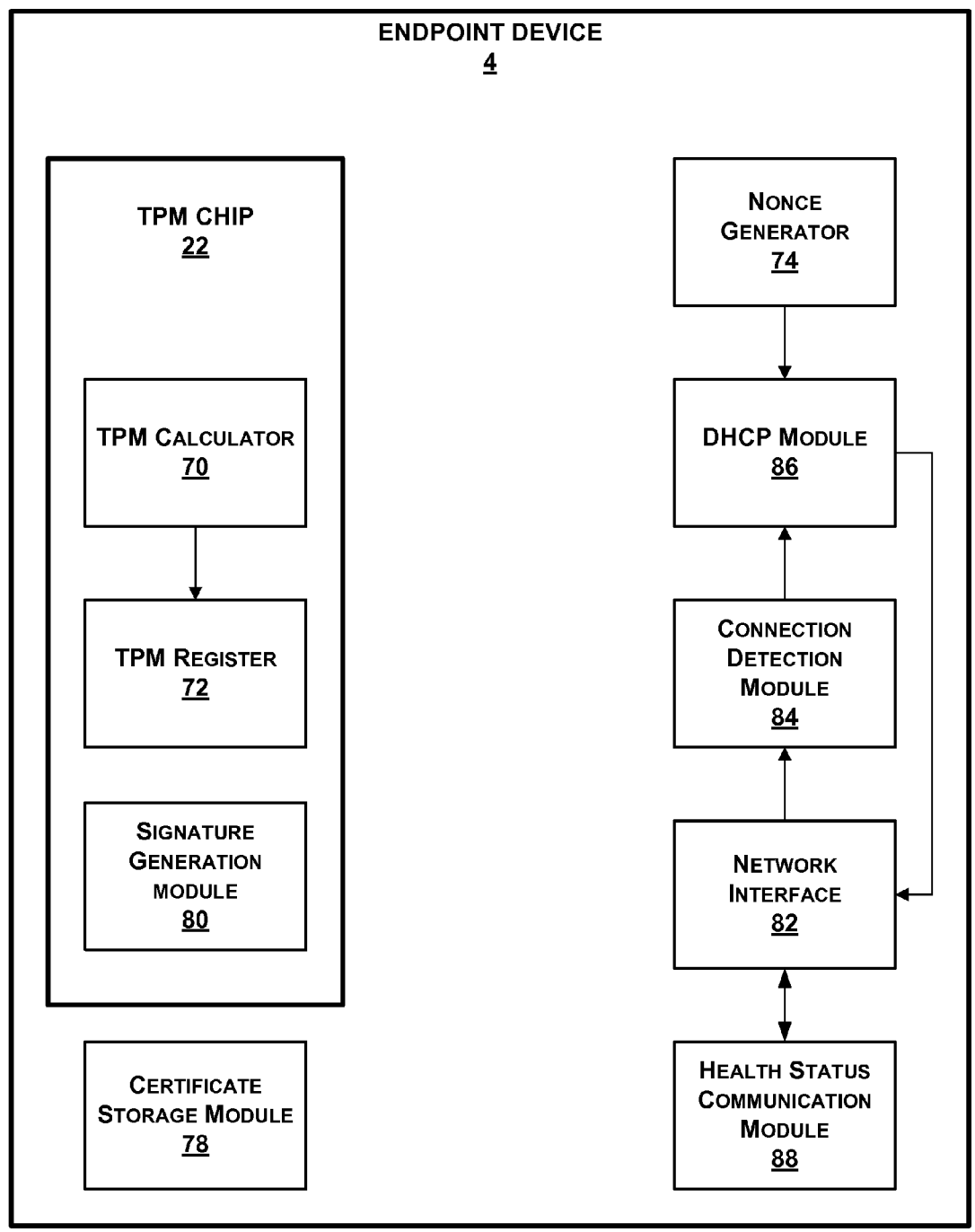
FIG. 3 is a block diagram illustrating exemplary details of an endpoint device.

FIG. 3 is a block diagram illustrating exemplary details of endpoint device 4. As illustrated in the example of FIG. 3, TPM chip 22 comprises a TPM calculator 70, a TPM register 72, and a signature generation module 80. When endpoint device 4 is powered on or restarts, TPM calculator 70 in TPM chip 22 calculates a TPM value and stores this TPM value in TPM register 72. TPM calculator 70 may calculate the TPM value by successively applying a hash function to the machine code instructions of software applications before the software applications are loaded. For example, TPM calculator 70 may apply a hash function to the machine code instructions of the basic input/output system ("BIOS") of endpoint device 4, then apply the hash function to the resulting hash value and a fixed value (e.g., zero) and store the resulting hash value in TPM register 72. In this example, TPM calculator 70 may then allow endpoint device 4 to load the BIOS. Next, TPM calculator 70 may apply the hash function to the machine code instructions of the boot loader of endpoint device 4, apply the hash function to a concatenation of the resulting hash value and the hash value in TPM register 72, and then store the resulting hash value in TPM register 72. TPM calculator 70 may then allow endpoint device 4 to load the boot loader. TPM calculator 70 may continue in this pattern with each software application in the boot sequence of endpoint device 4. Because the TPM value is generated within TPM chip 22, no hardware module or software application in endpoint device 4 other than TPM calculator 70 can alter the TPM value generated by TPM calculator 70.

A nonce generator 74 in endpoint device 4 generates nonce information for endpoint device 4. In a first example, nonce generator 74 may generate nonce information for endpoint device 4 by generating an initial sequence number. In a second example, nonce generator 74 may generate nonce information for endpoint device 4 by storing a timestamp that indicates the current time. In a third example, nonce generator 74 may generate and store a series of pseudorandom nonce values. In example implementations in which nonce generator 74 is included in TPM chip 22, no hardware module or software application in endpoint device 4 other than nonce generator 74 can alter the nonce information generated by nonce generator 74.

In addition to TPM chip 22, endpoint device 4 includes a network interface 82 and a certificate storage module 78. Network interface 82 may be a wired or wireless network interface. For instance, network interface 82 may be an Ethernet network interface, a Wi-Fi network interface, or some other type of network interface. Certificate storage module 78 stores one or more digital certificates for TPM chip 22. A digital certificate associated with TPM chip 22 may specify a public encryption key, a certificate authority that issued the digital certificate, a digital signature of the public key signed with the private key of the specified certificate authority, and other information. Because the digital certificate is signed, any modification to the digital certificate can be detected.

A connection detection module 84 in endpoint device 4 determines whether network interface 82 is connected to a link layer network. When connection detection module 84 determines that network interface 82 has become connected to a link layer network, a DHCP module 86 in endpoint device 4 formulates a DHCP discovery message.

In order to formulate this DHCP discovery message, DHCP module 86 retrieves the TPM value from TPM register 72. In addition, DHCP module 86 may send a request for a current nonce value to nonce generator 74. When nonce generator 74 receives this request, nonce generator 74 may identify the current nonce value. Nonce generator 74 may identify the current nonce value in a variety of ways. In a first example, the set of nonce information specifies a sequence number. In this first example, nonce generator 74 may return the specified sequence number and then increment the sequence number. In a second example, the set of nonce information specifies a timestamp. In this second example, nonce generator 74 may return the current time. In a third example, the set of nonce information specifies a set of values that have been previously negotiated or generated on a pseudorandom basis. In this third example, nonce generator 74 may return a value in the set and then remove the first value from the set of values. If there are no remaining values in the set of values or the set of values is almost empty, nonce generator 74 may, in this third example, indicate to DHCP module 84 that endpoint device 4 and health evaluation module 26 should negotiate a new set of nonce information. Alternatively, nonce generator 74 may, in this third example, employ a pseudo-random number generator to generate more nonce values.

After retrieving the TPM value and the current nonce value, DHCP module 86 may instruct signature generation module 80 to generate a digital signature based on the TPM value and the current nonce value. When signature generation module 80 generates a digital signature based on the TPM value and the current nonce value, signature generation module 80 may generate an input value by concatenating or otherwise combining the TPM value and the current nonce value. Next, signature generation module 80 may generate a hash value by applying a hash function to this input value. Signature generation module 80 may then use the private encryption key of TPM chip 22 to encrypt the hash value, resulting in a digital signature (as specified in the RSA digital signature algorithm). In addition to the RSA digital signature algorithm, the techniques described in this disclosure may employ other digital signature generation algorithms such as the Digital Signature Algorithm ("DSA"). Signature generation module 80 may return this digital signature to DHCP module 84 as the digital signature based on the TPM value and the current nonce value. Because signature generation module 80 is within TPM chip 22, it is not necessary for any hardware module or software application outside TPM chip 22 to have access to the private encryption key of TPM chip 22. Because no hardware module or software application outside TPM chip 22 has access to the private encryption key of TPM chip 22, no hardware module or software application outside TPM chip 22 is able to use the private encryption key of TPM chip 22.

After DHCP module 86 receives the TPM value from TPM register 72, the current nonce value from nonce generator 74, and the digital signature from signature generator 80, DHCP module 86 generates a DHCP discovery message that includes the TPM value, the current nonce value, and the digital signature. Furthermore, DHCP module 86 may set an "information refresh" flag in the DHCP discovery message. The "information refresh" flag indicates to health evaluation module 26 that health evaluation module 26 should refresh any NAC information associated with endpoint device 4 that health evaluation module 26 has stored. DHCP module 86 may set the "information refresh" flag when nonce generator 74 indicates to DHCP module 86 that there are no remaining values in a previously-negotiated set of nonce values or when the previously-negotiated set of nonce values is almost empty. In addition, DHCP module 86 may set the "information refresh" flag when the public key certificate associated with TPM chip 22 changes. After DHCP module 86 generates the DHCP discovery message, DHCP module 86 causes network interface 82 to broadcast the DHCP discovery message on the link layer network.

Due to the constraints of the tightly-constrained handshake sequence, endpoint device 4 may be unable to send the TPM value and/or the nonce value to health evaluation module 26 during the tightly-constrained handshake sequence. In this circumstance, DHCP module 86 may omit the TPM value from the DHCP discovery message if the TPM value is not changed since endpoint device 4 and access control device 20 last performed the handshake sequence. Furthermore, DHCP module 86 may omit the nonce value from the DHCP discovery message if health evaluation module 26 is able to independently calculate the nonce value used to generate the digital signature (i.e., the signed nonce value).

When DHCP server module 24 receives the DHCP discovery message, DHCP server module 24 consults with health evaluation module 26 and leases an IP address to endpoint device 4. This lease process typically involves the exchange of DHCP offer, request, and acknowledgement messages in the ordinary manner specified by IETF RFC 2131.

After DHCP server module 24 leases an IP address to endpoint device 4, a health status communication module 88 in endpoint device 4 may receive a NAC information request from health evaluation module 26. When health status communication module 88 receives the NAC information request, health status communication module 88 retrieves the public key certificate of TPM chip 22 from certificate storage module 78, and sends a request for a set of nonce information to nonce generator 74. When nonce generator 74 receives the request for the set of nonce information, nonce generator 74 may perform a variety of actions depending on the type of nonce information used by endpoint device 4 and health evaluation module 26. In a first example, the set of nonce information specifies a sequence number. In this first example, nonce generator 74 may return an initial sequence number (e.g., 0). In a second example, the set of nonce information specifies an initial timestamp. In the second example, nonce generator 74 returns the initial timestamp. In a third example, the set of nonce information specifies a series of values that nonce generator 74 has negotiated or generated on a pseudorandom basis. In the third example, nonce generator 74 returns the series of values.

In addition to retrieving the public key certificate of TPM chip 22, and the set of nonce information, health status communication module 88 may instruct signature generation module 80 to use the private encryption key of TPM chip 22 to generate a digital signature of the set of nonce information and the public key certificate of TPM chip 22. After signature generation module 80 generates this digital signature, health status communication module 88 may send the set of nonce information, the public key certificate of TPM chip 22, and the digital signature to health evaluation module 26.

Figure 4:
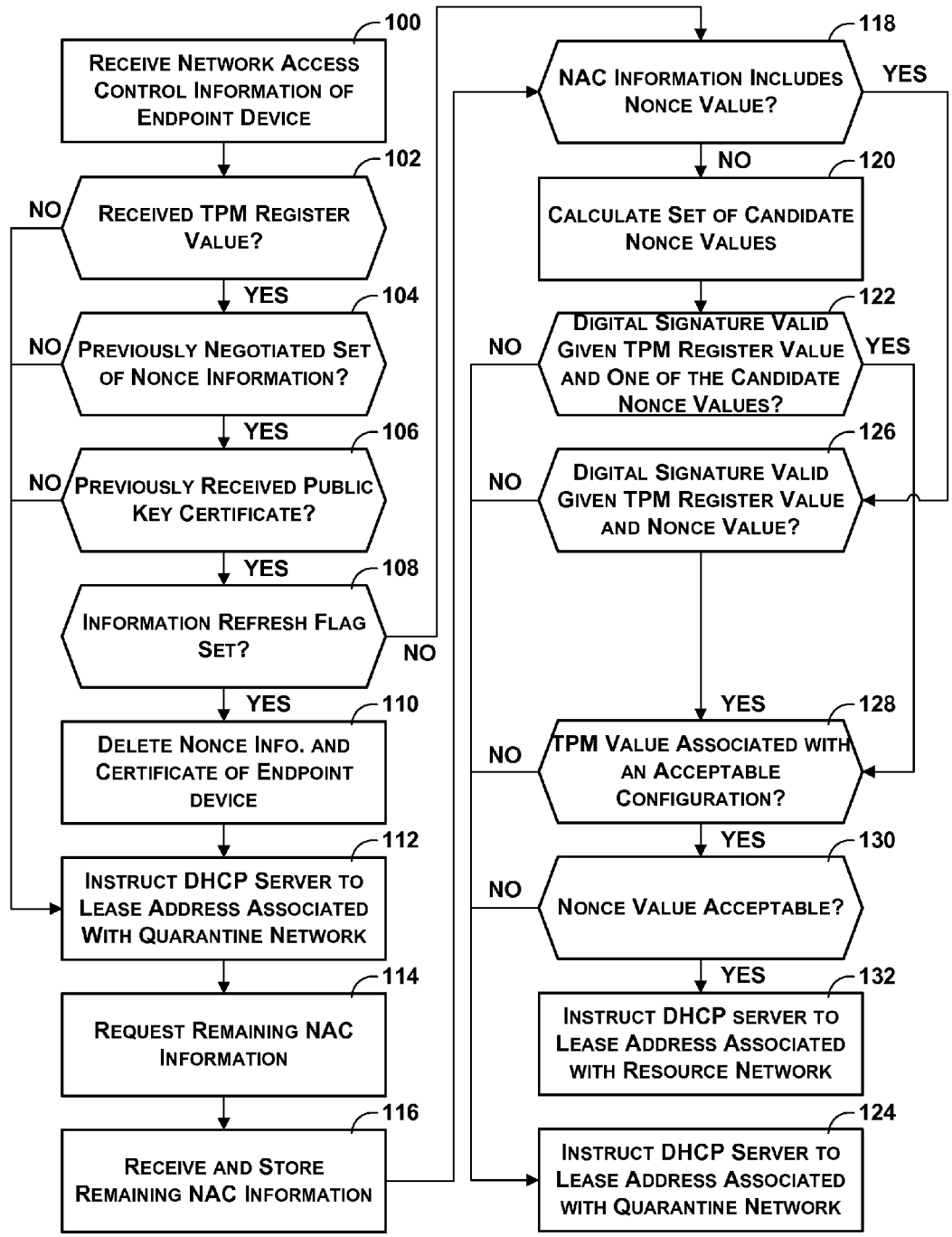
FIG. 4 is a flowchart illustrating an exemplary operation of the health evaluation module.

FIG. 4 is a flowchart illustrating an exemplary operation of health evaluation module 26. Initially, request reception module 40 in health evaluation module 26 receives NAC information that was provided to access control device 20 as an initial (first) communication of an access control handshake sequence (100). This NAC information includes a digital signature based on a TPM value and a nonce value. When request reception module 40 receives the NAC information, cache management module 42 in health evaluation module 26 may determine whether health evaluation module 26 has received a TPM value associated with endpoint device 4 (102). For instance, health evaluation module 26 may have received the TPM value associated with endpoint device 4 as part of the NAC information. In another instance, the NAC information does not include the TPM value, but TPM cache 45 stores a TPM value that health evaluation module 26 has previously received. If cache management module 42 determines that health evaluation module 26 has received a TPM value associated with endpoint device 4 ("YES" of 102), cache management module 42 determines whether health evaluation module 26 has previously negotiated a set of nonce information with endpoint device 4 (104). For instance, cache management module 42 may determine whether health evaluation module 26 has previously negotiated a set of nonce information with endpoint device 4 by determining whether nonce information cache 46 includes a set of nonce information associated with endpoint device 4.

If health evaluation module 26 has previously negotiated a set of nonce information with endpoint device 4 ("YES" of 104), cache management module 42 may determine whether health evaluation module 26 has previously received a public key certificate associated TPM chip 22 in endpoint device 4 (106). For instance, cache management module 42 may determine whether health evaluation module 26 has previously received a public key certificate associated with TPM chip 22 by determining whether certificate cache 50 includes a public key certificate associated with TPM chip 22.

If cache management module 42 determines that health evaluation module 26 has previously received a public key certificate associated with TPM chip 22 ("YES" of 106), cache management module 42 determines whether an "information refresh" flag in the NAC information is set (108). The "information refresh" flag indicates that some of the cached NAC information must be refreshed. If the "information refresh" flag in the NAC information is set ("YES" of 108), cache management module 42 may delete the set of nonce information associated with endpoint device 4 from nonce information cache 46 and may delete the public key certificate associated with TPM chip 22 from certificate cache 50 (110). Access instruction module 64 may then instruct DHCP server module 24 to lease to endpoint device 4 an IP address associated with quarantine network 12 (112).

If cache management module 42 determines that health evaluation module 26 has not received a TPM value associated with endpoint device 4 ("NO" of 102), access instruction module 64 may also instruct DHCP server module 24 to lease to endpoint device 4 an IP address associated with quarantine network 12 (112). Similarly, if cache management module 42 determines that health evaluation module 26 has not previously negotiated a set of nonce information with endpoint device 4 ("NO" of 104), access instruction module 64 may also instruct DHCP server module 24 to lease to endpoint device 4 an IP address associated with quarantine network 12 (112). Likewise, if health evaluation module 26 has not previously received a public key certificate associated with TPM chip 22 ("NO" of 106), access instruction module 64 may instruct DHCP server module 24 to lease to endpoint device 4 an IP address associated with quarantine network 12 (112).

After DHCP server module 24 assigns to endpoint device 4 an IP address associated with quarantine network 12, cache management module 42 may request from endpoint device 4 any remaining NAC information that health evaluation module 26 requires in order to determine whether to allow endpoint device 4 to communicate on resource network 14 (114). For instance, if cache management module 42 determined that health evaluation module 26 has not previously received a public key certificate associated with TPM chip 22, cache management module 42 may request from endpoint device 4 the public key certificate associated with TPM chip 22. Cache management module 42 may subsequently receive and store a set of nonce information and the public key certificate from endpoint device 4 received via quarantine network 12 (116). Cache management module 42 may store the nonce information in nonce information cache 46 and the certificate in certificate cache 50.

If the "information refresh" flag in the NAC information is not set ("NO" of 108) or after health evaluation module 26 has received all necessary NAC information, nonce calculation module 48 in health evaluation module 26 may determine whether the received NAC information includes a nonce value (118). If nonce calculation module 48 determines that the received NAC information does not include a nonce value ("NO" of 118), nonce calculation module 48 may calculate a set of one or more candidate nonce values (120). After calculating the set of one or more candidate nonce values, signature verification module 52 uses the public key certificate associated with TPM chip 22 to determine whether the digital signature in the received NAC information is valid given the received TPM value and any candidate nonce value in the set of candidate nonce values (122). In order to determine whether the digital signature in the received NAC information is valid given the received TPM value and any candidate nonce value in the set of candidate nonce values, signature verification module 52 may generate a set of hash values based on each of the candidate nonce values and the TPM value and compare each of these hash values to a decrypted version of the digital signature. If any of the hash values is equal to the decrypted version of the digital signature, the digital signature is valid. If signature verification module 52 determines that the digital signature in the received NAC information is not valid given the received TPM value and any of the candidate nonce values ("NO" of 122), access instruction module 64 may instruct DHCP server module 24 to lease to endpoint device 4 an IP address associated with quarantine network 12 (124).

On the other hand, if nonce calculation module 48 determines that the received NAC information includes a nonce value ("YES" of 118), signature verification module 52 may use the public key certificate associated with TPM chip 22 to determine whether the digital signature in the received NAC information is valid given the received TPM value and the nonce value included in the received NAC information (126). For instance, if the received NAC information includes a nonce value, signature verification module 52 may generate a hash value based on the nonce value and the TPM value and compare this hash value to a decrypted version of the digital signature. In this instance, if the hash value is equal to the decrypted version of the digital signature, the digital signature is valid. If signature verification module 52 determines that the digital signature in the received NAC information is not valid given the received TPM value and the received nonce value ("NO" of 126), access instruction module 64 may instruct DHCP server module 24 to lease to endpoint device 4 an IP address associated with quarantine network 12 (124).

Otherwise, if signature verification module 52 determines that the digital signature in the received NAC information is valid given the TPM value and one of the candidate nonce values ("YES" of 122) or if signature verification module 52 determines that the digital signature in the received NAC information is valid given the TPM value and the received nonce value ("YES" of 126), this disclosure refers to the TPM value upon which the digital signature is based as the "signed TPM value" and to the nonce value upon which the digital signature is based as the "signed nonce value." Following the determination that the digital signature in the received NAC information is valid, TPM evaluation module 54 determines whether the signed TPM value is associated with an acceptable configuration (128). For example, TPM evaluation module 54 may determine whether the signed TPM value is in list 56. If TPM evaluation module 54 determines that the signed TPM value is not associated with an acceptable configuration ("NO" of 128), access instruction module 64 may instruct DHCP server module 24 to lease to endpoint device 4 an IP address associated with quarantine network 12 (124).

If TPM evaluation module 54 determines that the signed TPM value is associated with an acceptable configuration ("YES" of 128), nonce evaluation module 60 uses the set of nonce information associated with endpoint device 4 to determine whether the signed nonce value is acceptable (130). If nonce evaluation module 60 determines that the signed nonce value is acceptable ("YES" of 130), access instruction module 64 may instruct DHCP server module 24 to lease to endpoint device 4 an IP address associated with resource network 14 (132). Otherwise, if nonce evaluation module 60 determines that the signed nonce value is not acceptable ("NO" of 130), access instruction module 64 may instruct DHCP server module 24 to lease to endpoint device 4 an IP address associated with quarantine network 12 (124).

Figure 5:
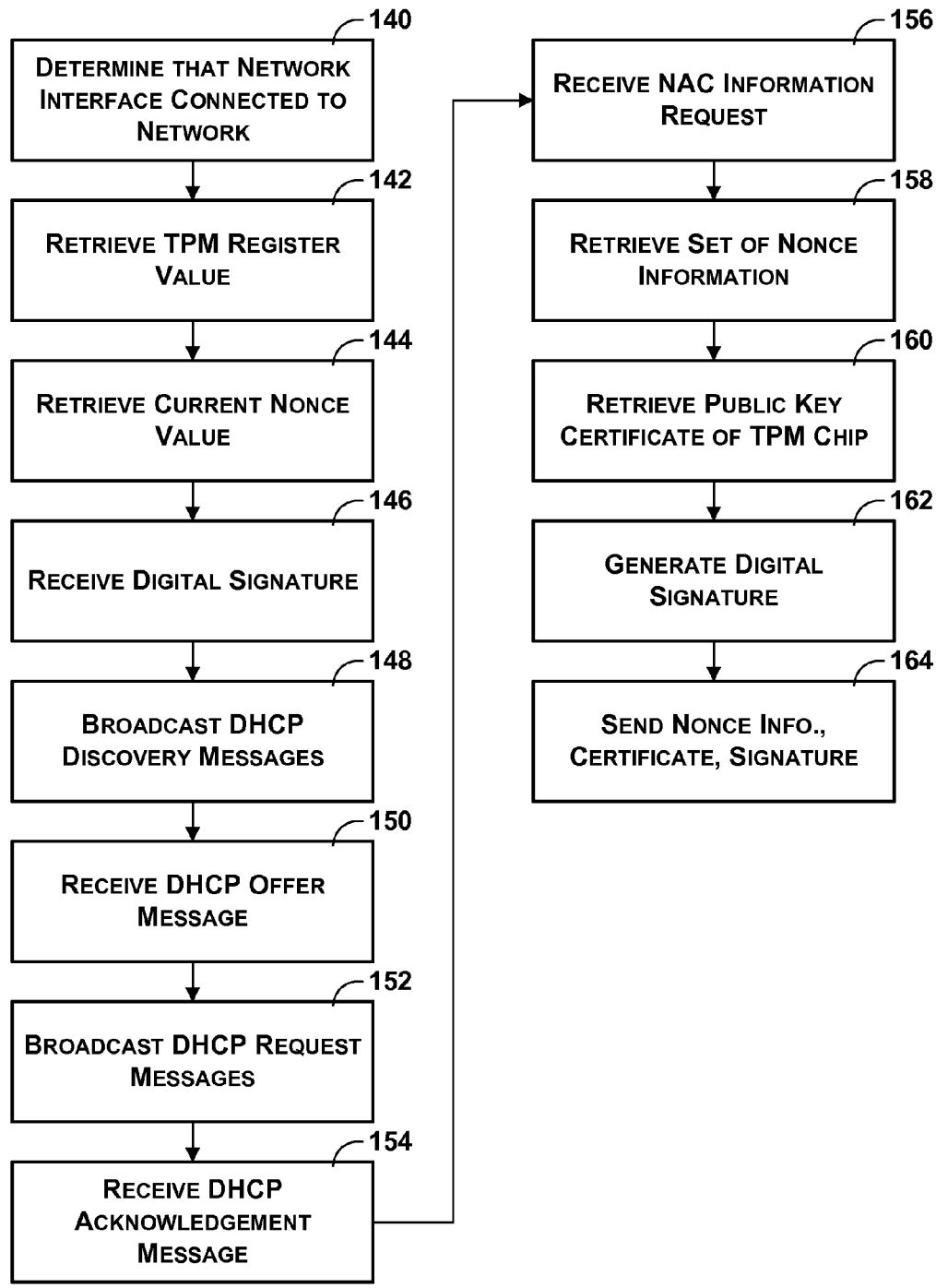
FIG. 5 is a flowchart illustrating an exemplary operation of an endpoint device.

FIG. 5 is a flowchart illustrating an exemplary operation of endpoint device 4. Initially, connection detection module 84 in endpoint device 4 determines that network interface 82 is connected to a link layer network (140). After connection detection module 84 determines that network interface 82 is connected to a link layer network, DHCP module 86 retrieves the TPM value from TPM register 72 (142). Next, DHCP module 86 retrieves a current nonce value from nonce generator 74 (144). DHCP module 86 may then receive from signature generation module 80 a digital signature based on the TPM value and the current nonce value (146). In accordance with one digital signature algorithm, signature generation module 80 may create this digital signature by concatenating the TPM value and the current nonce value, generating a hash value by applying a hash function to the result, and then encrypting the hash value using the private encryption key of TPM chip 22.

After DHCP module 86 has received the TPM value, the nonce value, and the digital signature, DHCP module 86 may use network interface 72 to output an initial (first) communication of an access control handshake sequence by broadcasting DHCP discovery messages that specify the digital signature and, optionally, the TPM value and the nonce value (148). Subsequently, DHCP module 86 may receive a second communication that completes the handshake sequence between endpoint device 4 and access control device 20, i.e., a DHCP offer message from DHCP server module 24 in this example (150). The DHCP offer message specifies an IP address that endpoint device 4 is to use when performing network layer communications.

In some embodiments, when DHCP module 86 receives the DHCP offer message, DHCP module 86 may use network interface 82 to broadcast DHCP request messages (152). The DHCP request messages specify the IP address specified in the DHCP offer message. When a DHCP server other than DHCP server module 24 receives the DHCP request message, this DHCP server may withdraw a DHCP offer message made by this DHCP server to endpoint device 4. When DHCP server module 24 receives the DHCP request message, DHCP server module 24 sends, and DHCP module 86 receives, a DHCP acknowledgement message (154). The DHCP acknowledgement message may specify how long the IP address is leased to endpoint device 4 and other information.

Once DHCP module 86 has received the DHCP acknowledgement message, health status communication module 88 in endpoint device 4 may receive a NAC information request from health evaluation module 26 (156). In response, health status communication module 88 may retrieve a set of nonce information from nonce generator 72 (158). Furthermore, health status communication module 88 may retrieve a public key certificate of TPM chip 22 from certificate storage module 78 (160). After health status communication module 88 retrieves the set of nonce information and the public key certificate, health status communication module 88 may instruct signature generation module 80 in TPM chip 22 to use the private encryption key of TPM chip 22 to generate a digital signature of the set of nonce information and the public key certificate (162). Health status communication module 88 may then send the set of nonce information, the public key certificate, and the digital signature to health evaluation module 26 (164).

Figure 6:
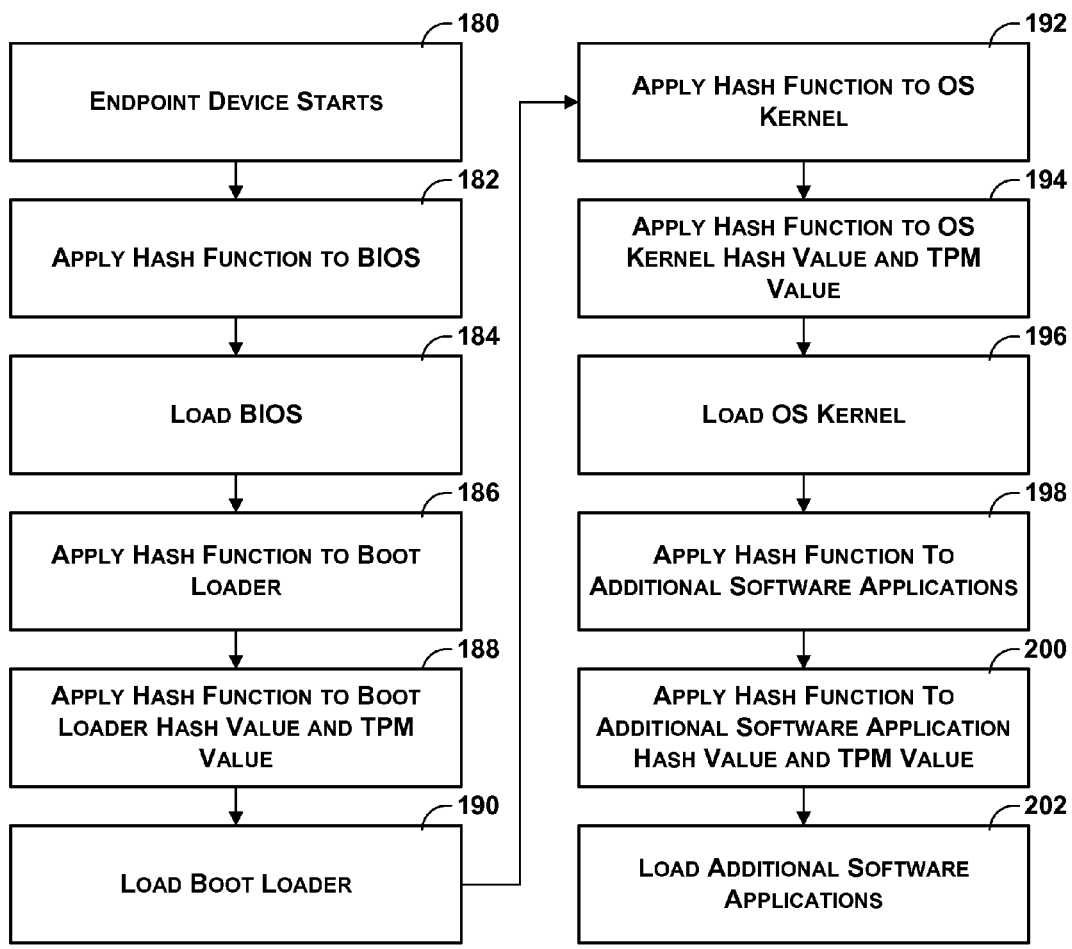
FIG. 6 is a flowchart illustrating an exemplary operation of a trusted platform module.

FIG. 6 is a flowchart illustrating an example operation of TPM chip 22. When endpoint device 4 powers on, TPM chip 22 assumes control of endpoint device 4 (180). After assuming control of endpoint device 4, TPM calculator 70 in TPM chip 22 applies a hash function to the machine code instructions of the BIOS of endpoint device 4 and stores the resulting hash value in TPM register 72 (182). For instance, TPM calculator 70 may apply a Secure Hash Algorithm ("SHA") hash function to the machine code instructions. No program or module of endpoint device 4 can modify the value of TPM register 72 except TPM calculator 70. Other hardware modules or software applications may be allowed, however, to read the value in TMP register 72. After storing the hash value in TPM register 72, TPM calculator 70 allows the BIOS to load (184).

Once the BIOS loads, the BIOS applies the hash function to the machine code instructions of the boot loader of endpoint device 4 and sends this hash value to TPM calculator 70 (186). When TPM calculator 70 receives this hash value from the BIOS, TPM calculator 70 applies the hash function to the hash value received from the BIOS concatenated with the value in TPM register 72 and stores the resulting hash value in TPM register 72 (thereby overwriting the previous value in TPM register 72) (188). After this, the BIOS allows the boot loader to load (190).

Once the boot loader loads, the boot loader applies the hash function to the machine code instructions of the OS kernel of endpoint device 4 and sends this hash value to the TPM calculator 70 (192). When TPM calculator 70 receives this hash value from the boot loader, TPM calculator 70 applies the hash function to the hash value received from the boot loader concatenated with the value in TPM register 72 and stores the resulting hash value in TPM register 72 (194). Next, the boot loader allows the OS kernel to load (196).

Once the OS kernel loads, and the OS kernel applies the hash function to one or more additional software applications and sends the resulting hash value to the TPM calculator (198). When TPM calculator 70 receives this hash value from the OS kernel, TPM calculator 70 applies the hash function to the hash value received from the OS kernel concatenated with the value in TPM register 72 and stores the resulting hash value in TPM register 72 (200). The additional software applications may include operating system services, antivirus software applications, and other types of software applications. After this, the OS kernel allows these additional software applications to load (202).

For explanatory purposes, the techniques discussed in this disclosure have been explained with regard to NAC information that specifies TPM values and nonce values. However, the techniques are not limited to NAC information that specifies TPM values and nonce values. Rather, the techniques may be applicable to a wide variety of situations in which a client device uses a network protocol that specifies a tightly-constrained handshake sequence that prevents an access control device or the endpoint device from sending needed information.

For example, an endpoint device may need to periodically download software patches from a patch server. These software patches may include security updates, program upgrades, bug fixes, or other types of software enhancements. In order to determine whether the endpoint device needs to download one or more software patches, the endpoint device may need to communicate on a network that includes the patch server. In order to acquire access to communicate on this network, the endpoint device may use a network protocol with a tightly-constrained handshake sequence that prevents the endpoint device or a NAC server from sending all of the information necessary to determine whether the endpoint device needs to download any software patches. For instance, it may be impractical for the endpoint device to send a complete list of all software applications with version numbers to the NAC server. Rather, in accordance with the techniques of this disclosure, the NAC server may store a previously negotiated list of the software applications installed on the endpoint device. Thus, when the endpoint device uses the tightly-constrained handshake sequence to determine whether the endpoint device needs to download one or more software patches, the endpoint device merely needs to send a list that specifies the differences between software applications currently installed on the endpoint device and the software applications specified by the list of software applications on the endpoint device stored by the NAC server.

In this example, after the endpoint device sends the list that specifies the differences to the NAC server, the NAC server may use the stored list of installed software applications and the list that specifies the differences to determine whether the endpoint device needs to download any software patches. If the NAC server determines that the endpoint device needs to download one or more software patches, the NAC server may allow the endpoint device to communicate on the network that includes the patch server. On the other hand, if the NAC server determines that the endpoint device does not need to download any software patches, the NAC server may allow the endpoint device to communicate on a second network. Furthermore, if the NAC server determines that the NAC server does not store a list of the programs installed on the endpoint device, the NAC server may allow the endpoint device to communicate on a third network. The endpoint device may use the third network to communicate the list of software applications installed on the endpoint device to the NAC server.

In one or more exemplary embodiments, the functions described may be implemented in hardware, software, and/or firmware, or any combination thereof. If implemented in hardware, the functions may be implemented in one or more microprocessors, microcontrollers, digital signal processors ("DSPs"), application specific integrated circuits ("ASICs"), field programmable gate arrays ("FPGAs"), or the like. Such components may reside within a communication system, a data writing and/or reading system, or other systems. If implemented in software, the functions may be stored as one or more instructions on a computer-readable medium. Computer-readable media includes both computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
receiving, with an access control device through a tightly-constrained handshake sequence of a network protocol, a first request to access a first network, wherein an endpoint device initiates the tightly-constrained handshake sequence when the endpoint device is requesting access rights for the first network;
in response to the first request and after the tightly-constrained handshake sequence, negotiating a set of nonce information with the endpoint device and receiving a trusted platform module ("TPM") value from the endpoint device, wherein, due to constraints of the tightly-constrained handshake sequence, the access control device and the endpoint device are unable to negotiate the set of nonce information during the tightly-constrained handshake sequence;
receiving, with the access control device, a second request to access the first network through a second tightly-constrained handshake sequence of the network protocol, wherein the second request includes a digital signature;
in response to the second request, determining with the access control device whether the digital signature is valid according to the TPM value and the set of nonce information previously negotiated with the endpoint device in response to the first request; and
granting the access rights to the endpoint device when the digital signature is valid.

2. The method of claim 1,
wherein the access rights comprise rights to communicate on the first network; and
wherein the method further comprises:
allowing the endpoint device to communicate on a second network in response to the first request and when the digital signature of the second request is not valid; and
using the second network to negotiate the set of nonce information with the endpoint device and to receive the TPM value from the endpoint device.

3. The method of claim 1,
wherein the network protocol is the Dynamic Host Configuration Protocol ("DHCP"); and
wherein granting the access rights to the endpoint device to communicate on the first network comprises causing an Internet Protocol ("IP") address to be leased to the endpoint device, wherein an access point forwards IP packets that specify the IP address as a source address to the first network.

4. The method of claim 1, wherein determining whether the digital signature of the second request is valid comprises:
calculating, in response to receiving the digital signature, a set of one or more candidate nonce values based on the nonce information negotiated in response to the first request;
determining whether the digital signature was generated from the TPM value received from the endpoint device in response to the first request and a candidate nonce value in the set of candidate nonce values.

5. The method of claim 1,
wherein the digital signature is encrypted using a private encryption key of a TPM chip in the endpoint device; and
wherein determining whether the digital signature is valid comprises using a public key certificate associated with the private encryption key to determine whether the digital signature is valid.

6. The method of claim 5, further comprising:
denying access to the first network and allowing the endpoint device to communicate on a second network when the public key certificate is not stored in a storage medium;
receiving the public key certificate via the second network; and
storing, in the storage medium, the public key certificate after receiving the public key certificate via the second network for use with a subsequent access request from the endpoint device.

7. The method of claim 1,
wherein the set of nonce information negotiated in response to the first request comprises a set of nonce values; and
wherein determining whether the digital signature is valid comprises:
determining that the digital signature is based on one of the nonce values in the set of values negotiated in response to the first request; and
removing from the set of nonce values the nonce value on which the digital signature is based so that the removed nonce value cannot be used to generate a valid digital signature for a subsequent access request from the endpoint device.

8. The method of claim 1,
wherein the set of nonce information negotiated in response to the first request comprises a time indicator that indicates a time; and
wherein determining whether the digital signature is valid comprises determining whether the digital signature was generated from a nonce value equal to the time indicated by the time indicator.

9. The method of claim 1,
wherein the set of nonce information negotiated in response to the first request comprises a sequence number; and
wherein determining whether the digital signature is valid comprises determining that the digital signature was generated from a nonce value equal to a number that follows the sequence number.

10. An access control device comprising:
a request reception module that receives a digital signature through a tightly-constrained handshake sequence of a network protocol, wherein an endpoint device initiates the tightly-constrained handshake sequence when the endpoint device is requesting access rights, wherein the digital signature is generated from a trusted platform module ("TPM") value and a nonce value, and wherein, due to constraints of the tightly-constrained handshake sequence, the access control device and the endpoint device are unable to negotiate a set of nonce information during the tightly-constrained handshake sequence;

a cache management module that determines whether the access control device has previously negotiated the set of nonce information with the endpoint device in response to a previous access request from the endpoint device;

a TPM evaluation module that determines whether the TPM value was previously received from the endpoint device in response to the previous access request and was determined to be associated with an acceptable configuration;

a nonce evaluation module that determines whether the nonce value is acceptable based on the set of nonce information previously negotiated with the endpoint device;

a signature verification module that determines whether the digital signature is valid when the digital signature is based on the TPM value previously received from the endpoint device and the set of nonce information previously negotiated with the endpoint device in response to the previous access request; and an access instruction module that grants the access rights to the endpoint device when the digital signature is valid.

11. The access control device of claim 10,
wherein the access right comprise rights to communicate on a first network;
wherein the access instruction module allows the endpoint device to communicate on a second network when the access control device has not previously negotiated the set of nonce information, when the TPM value is not associated with the acceptable configuration, when the nonce value is not acceptable, or when the digital signature is not valid; and
wherein the access control device uses the second network to negotiate the set of nonce information with the endpoint device.

12. The access control device of claim 10,
wherein the access right comprise rights to communicate on a first network;
wherein the network protocol is the Dynamic Host Configuration Protocol ("DHCP"); and
wherein the access instruction module causes the endpoint device to be able to communicate on the first network by causing an Internet Protocol ("IP") address to be leased to the endpoint device, wherein an access point forwards IP packets that specify the IP address as a source address to the first network.

13. The access control device of claim 10,
wherein, due to constraints of the tightly-constrained handshake sequence, the endpoint device is unable to send the TPM value and the nonce value to the access control device during the tightly-constrained handshake sequence of the network protocol; and
wherein the cache management module determines whether the TPM value is associated with the acceptable configuration when the access control device has previously received the TPM value;
wherein the access control device further comprises a nonce calculation module that calculates a set of one or more candidate nonce values;

wherein the signature verification module determines whether the digital signature is valid given the TPM value and a candidate nonce value in the set of candidate nonce values; and
wherein the nonce evaluation module determines whether the nonce value is acceptable at least in part by determining whether the candidate nonce value is acceptable.

14. The access control device of claim 10,
wherein the digital signature is encrypted using a private encryption key of a TPM chip in the endpoint device; and
wherein the signature verification module uses a public key certificate associated with the private encryption key to determine whether the digital signature is valid.

15. The access control device of claim 14,
wherein the access instruction module allows the endpoint device to be able to communicate on a second network when the public key certificate is not stored in the storage medium; and
wherein the cache management module stores, in the storage medium, the public key certificate after receiving the public key certificate via the second network.

16. The access control device of claim 10,
wherein the set of nonce information comprises a set of values;
wherein the nonce evaluation module determines that the nonce value is acceptable when the nonce value is in the set of values; and
wherein the nonce evaluation module removes the nonce value from the set of values when the nonce value is in the set of values.

17. The access control device of claim 10,
wherein the set of nonce information comprises a time indicator that indicates a time; and
wherein the nonce evaluation module determines that the nonce value is acceptable based on the time indicated by the time indicator.

18. The access control device of claim 10,
wherein the set of nonce information comprises a sequence number; and
wherein the nonce evaluation module determines that the nonce value is acceptable when the nonce value is equal to a number that follows the sequence number.

19. A non-transitory computer-readable medium comprising instructions, wherein the instructions cause one or more programmable processors of an access control device to:
receive, with an access control device through a tightly-constrained handshake sequence of a network protocol, a first request to access a first network, wherein an endpoint device initiates the tightly-constrained handshake sequence when the endpoint device is requesting access rights for the first network;
in response to the first request and after the tightly-constrained handshake sequence, negotiate a set of nonce information with the endpoint device and receive a trusted platform module ("TPM") value from the endpoint device, wherein, due to constraints of the tightly-constrained handshake sequence, the access control device and the endpoint device are unable to negotiate the set of nonce information during the tightly-constrained handshake sequence;
receive a second request to access the first network through a second tightly-constrained handshake sequence of the network protocol, wherein the second request includes a digital signature;
in response to the second request, determine with the access control device whether the digital signature was generated from the TPM value and the set of nonce information previously negotiated with the endpoint device in response to the first request; and grant the access rights to the endpoint device when the digital signature is valid.

20. The non-transitory computer-readable medium of claim 19, wherein the instructions further cause the one or more programmable processors to:

calculate, in response to receiving the digital signature, a set of one or more candidate nonce values based on the nonce information negotiated in response to the first request;

determine whether the digital signature was generated from the TPM value received from the endpoint in response to the first request and a candidate nonce value in the set of candidate nonce values.

21. The non-transitory computer-readable medium of claim 19, wherein the network protocol is the Dynamic Host Configuration Protocol ("DHCP"); and wherein the instructions cause the one or more programmable processors to allow the endpoint device to communicate on the first network at least in part by causing the one or more programmable processors to cause an Internet Protocol ("IP") address to be leased to the endpoint device, wherein an access point forwards IP packets that specify the IP address as a source address to the first network.

22. The non-transitory computer-readable medium of claim 19, wherein the digital signature is encrypted using a private encryption key of a TPM chip in the endpoint device; and wherein the instructions cause the one or more programmable processors to determine whether the digital certificate is valid at least in part by causing the one or more programmable processors to use a public key certificate associated with the private encryption key to determine whether the digital signature is valid.

23. The non-transitory computer-readable medium of claim 22, wherein the instructions further cause the one or more programmable processors to:

allow the endpoint device to communicate on a second network when the public key certificate is not stored in the storage medium;

receive the public key certificate via the second network; and store, in the storage medium, the public key certificate after receiving the public key certificate via the second network for use with a subsequent access request from the endpoint device.

24. The non-transitory computer-readable medium of claim 19, wherein the set of nonce information negotiated in response to the first request comprises a set of nonce values; and wherein the instructions cause the one or more programmable processors to determine whether the digital signature is valid at least in part by causing the one or more programmable processors to:

determine that the digital signature is based on one of the nonce values in the set of values negotiated in response to the first request; and remove from the set of nonce values the nonce value on which the digital signature is based so that the removed nonce value cannot be used to generate a valid digital signature for a subsequent access request from the endpoint device.

25. The non-transitory computer-readable medium of claim 19, wherein the set of nonce information negotiated in response to the first request comprises a time indicator that indicates a time; and wherein the instructions cause the one or more programmable processors to determine whether the digital signature is valid comprises determining whether the digital signature was generated from nonce value equal to the time indicated by the time indicator.

* * * * *